No. 851,102. PATENTED APR. 23, 1907.
W. L. OWENS.
SWAY BAR FASTENER.
APPLICATION FILED SEPT. 8, 1906.

WITNESSES:
J. A. Parron.
M. A. Schmidt.

INVENTOR
W. L. Owens
BY Milo B. Stevens & Co.
Attorneys

UNITED STATES PATENT OFFICE.

WILLIAM LEWIS OWENS, OF SALT, LOUISIANA.

SWAY-BAR FASTENER.

No. 851,102.  Specification of Letters Patent.  Patented April 23, 1907.

Application filed September 8, 1906. Serial No. 333,820.

*To all whom it may concern:*

Be it known that I, WILLIAM LEWIS OWENS a citizen of the United States, residing at Salt, in the parish of Winn and State of Louisiana, have invented new and useful Improvements in Sway-Bar Fasteners, of which the following is a specification.

This invention relates to logging cars, and has for its object to provide improved means for securing the sway bars to the bunks.

Figure 1:
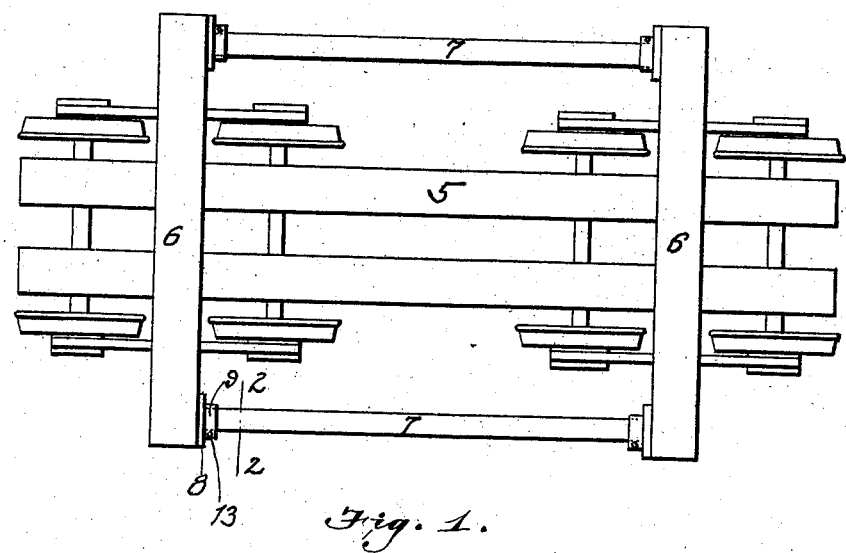
Figure 2:
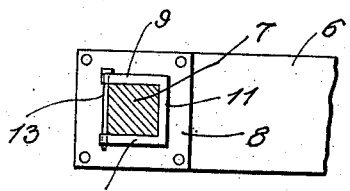
Figure 3:
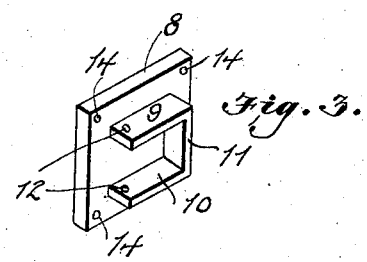

In the accompanying drawing, Figure 1 is a plan view of a logging car showing the application of the invention. Fig. 2 is a vertical section on the line 2—2 of Fig. 1. Fig. 3 is a perspective view of the invention detached.

Referring specifically to the drawings, 5 denotes the main frame of a logging car, on which are supported transversely the bunks 6. The usual sway bars for connecting the ends of the bunks are indicated at 7. Ordinarily, the sway bars are mortised into the bunks which weakens the latter and is otherwise unsatisfactory.

The present invention is designed to provide better fastening means for the sway bars, and which will be safe and strong.

To this end the invention consists of a plate 8 from the face of which project vertically spaced flanges 9 and 10, respectively, which are connected at one end by a vertically extending flange 11. These flanges form a socket or seat to receive the end of the sway bar, and the socket is opened in front so that the sway bar may be inserted lengthwise.

In the flanges 9 and 10 adjacent the open end of the socket are registering holes 12 which receive a pin 13 for locking the sway bar in the socket. The socket piece is bolted or otherwise secured to the bunk, bolt holes 14 for this purpose being made in the plate 8. Each end of the sway bar will be supported in one of the socket pieces.

The construction herein described affords a safe and strong fastening for the sway bars and they can be readily removed by pulling out the pins 13.

I claim:—

1. The combination with the bunk and sway bar of a logging car, of a socket piece on the bunk to receive the end of the sway bar, said socket piece having an opening to permit entry of the sway bar, and locking means extending across the opening in front of the sway bar.

2. The combination with the bunk and sway bar of a logging car, of a plate secured to the bunk, and having vertically spaced projecting flanges connected at one end to form a socket which receives the end of the sway bar, and having at the opposite end registering openings, and a locking pin extensible through the said openings in front of the sway bar.

In testimony whereof I have signed my name to this specification in the presence of two subscribing witnesses.

WILLIAM LEWIS OWENS.

Witnesses:
 THOS. J. HENDERSON,
 OSCAR B. THOMPSON.